United States Patent
Wang et al.

(10) Patent No.: US 10,669,442 B2
(45) Date of Patent: Jun. 2, 2020

(54) LIGHT-CURABLE TRANSPARENT INK FOR 3D INK-JET PRINTING AND PREPARATION METHOD THEREOF

(71) Applicant: ZHUHAI SEINE TECHNOLOGY CO., LTD., Zhuhai (CN)

(72) Inventors: Feng Wang, Zhuhai (CN); Likun Wang, Zhuhai (CN); Qiancheng Yang, Zhuhai (CN); Jia Li, Zhuhai (CN)

(73) Assignee: ZHUHAI SEINE TECHNOLOGY CO., LTD., Zhuhai, Guangdong (CN)

( * ) Notice: Subject to any disclaimer, the term of this patent is extended or adjusted under 35 U.S.C. 154(b) by 0 days.

(21) Appl. No.: 16/025,957

(22) Filed: Jul. 2, 2018

(65) Prior Publication Data

US 2018/0312707 A1 Nov. 1, 2018

Related U.S. Application Data

(63) Continuation of application No. PCT/CN2017/085455, filed on May 23, 2017.

(30) Foreign Application Priority Data

Jul. 11, 2016 (CN) .......................... 2016 1 0547409

(51) Int. Cl.
| | |
|---|---|
| *C08F 2/46* | (2006.01) |
| *C08F 2/50* | (2006.01) |
| *C08G 61/04* | (2006.01) |
| *C09D 11/38* | (2014.01) |
| *C09D 11/101* | (2014.01) |
| *B33Y 80/00* | (2015.01) |
| *C09D 11/10* | (2014.01) |
| *B33Y 70/00* | (2020.01) |
| *C08F 220/18* | (2006.01) |
| *C08F 220/28* | (2006.01) |
| *C08F 220/38* | (2006.01) |
| *C09D 11/107* | (2014.01) |

(52) U.S. Cl.
CPC .............. *C09D 11/38* (2013.01); *B33Y 70/00* (2014.12); *B33Y 80/00* (2014.12); *C08F 220/18* (2013.01); *C08F 220/28* (2013.01); *C08F 220/38* (2013.01); *C09D 11/10* (2013.01); *C09D 11/101* (2013.01); *C09D 11/107* (2013.01); *C08F 2220/282* (2013.01); *C08F 2220/387* (2013.01); *C08F 2800/20* (2013.01)

(58) Field of Classification Search
CPC ..... C09D 11/38; C09D 11/107; C09D 11/101; C09D 11/10; B33Y 70/00; B33Y 80/00; C08F 220/28; C08F 220/18; C08F 220/38; C08F 2220/282; C08F 2220/387; C08F 2220/1013; C08F 2220/1875; C08F 2220/343; C08F 2800/20
USPC ........................................ 522/172, 1; 520/1
See application file for complete search history.

(56) References Cited

U.S. PATENT DOCUMENTS

| | | | | |
|---|---|---|---|---|
| 9,458,335 | B1* | 10/2016 | Sloan | C09D 11/12 |
| 2010/0309268 | A1* | 12/2010 | Van Dyck | B41J 11/002 347/102 |
| 2016/0145452 | A1 | 5/2016 | Fong et al. | 11/101 |

FOREIGN PATENT DOCUMENTS

| | | |
|---|---|---|
| CN | 1788037 A | 6/2006 |
| CN | 1933961 A | 3/2007 |
| CN | 103160168 A | 6/2013 |
| CN | 103980594 A | 8/2014 |
| CN | 104059353 A | 9/2014 |
| CN | 105131581 | * 12/2015 |
| CN | 105131581 A | 12/2015 |
| CN | 105199058 A | 12/2015 |

OTHER PUBLICATIONS

Ding et al, CN 105131581 Machine Translation, dated Dec. 9, 2015 (Year: 2015).*
The International Search Report of corresponding International PCT Application No. PCT/CN2017/085455, dated Aug. 11, 2017.
The Chinese First Examination Report of corresponding China patent application No. 201610547409.4, dated Feb. 14, 2018.

* cited by examiner

*Primary Examiner* — Jessica Whiteley
(74) *Attorney, Agent, or Firm* — J.C. Patents

(57) ABSTRACT

A light-curable transparent ink for 3D ink-jet printing and a method for preparing the same are provided. The light-curable transparent ink for 3-D ink-jet printing includes the following components: an acrylate monomer, a mercapto compound, a surfactant, a photoinitiator and an additive. The light-curable transparent ink for 3D ink-jet printing can inhibit yellowing and turbidity of the printed product.

17 Claims, No Drawings

LIGHT-CURABLE TRANSPARENT INK FOR 3D INK-JET PRINTING AND PREPARATION METHOD THEREOF

CROSS-REFERENCE TO RELATED APPLICATIONS

This application is a continuation of International Application No. PCT/CN2017/085455, filed on May 23, 2017, which claims priority to Chinese Patent Application No. 201610547409.4, filed on Jul. 11, 2016. The disclosures of the aforementioned applications are hereby incorporated by reference in their entireties.

TECHNICAL FIELD

The present invention relates to printing technology and, more particularly, to a light-curable transparent ink for 3D ink-jet printing and a preparation method thereof, belonging to the technical field of 3D ink-jet printing.

BACKGROUND

The statements in this section merely provide background information related to the present disclosure and do not necessarily constitute prior art.

3D ink-jet printing technology, which is based on the operation principle of ink-jet printer, enables ink in the nozzle chamber to instantaneously form droplets under the excitation of digital signals. The droplets are ejected from the nozzle at a certain velocity and frequency, and then are cured layer by layer according to a specified path, and in the end, a 3D object is created.

Ink for 3D ink-jet printing can be categorized into light-curable ink and temperature-solidifiable ink according to different curing sources. Light-curable ink usually contains photoinitiator, oligomer and monomer, where the photoinitiator is stimulated by light irradiation to produce free radicals that promote polymerization between the oligomer and monomer to cure the ink. The temperature-solidifiable ink usually contains wax components, and the ink is solidified by lowering the ambient temperature to below the melting point of the wax. However, use of the temperature-solidifiable ink requires strict control of the temperature during the entire ink-jet printing process, and there is a risk that the printed product will melt or deform at a high temperature, and thus the temperature-solidifiable ink is limited in their application range.

On the other hand, 3D ink-jet printing ink can be classified into cyan ink, magenta ink, yellow ink, black ink, white ink and transparent ink, depending on the colorant, among which the transparent ink has always been most challenging for researchers.

The existing light-curable transparent ink are different from typical light-curable color inks such as cyan ink, magenta ink, yellow ink, black ink and white ink, the biggest drawback thereof is that the printed product tends to turn yellow and looks opaque.

More often than not, the printed products turn yellow when the light-curable transparent ink undergoes the light-curable reaction, the primary reasons are as follows: 1. the photoinitiator in ink decomposes to produce a quinone structure, which causes yellowing of the printed product; 2. the photoinitiator itself is yellow, and if the photoinitiator in the ink is not completely consumed after the light-curable reaction, then the remaining photoinitiator causes the printed product to appear yellowish; 3. free radicals produced after the photoinitiator has been irradiated with light are more reactive, and can lead to breakage of already polymerized molecular chains in the ink, resulting in a conjugated structure and thereby causing yellowing of the printed product; 4. the main reason of yellowing caused by aging of the base resin in the ink is that: conjugated double bonds produced by breakage of polymer chains, and when the amount of conjugates reaches a certain level, yellowing occurs; or carbonyl groups produced by oxidation after aging and breakage of polymer chains; or colored amines produced by decomposition of nitrogen-containing substances; 5. surfactant in the ink is incompatible with the whole system, making the printed product looks turbid.

SUMMARY

The present invention provides light-curable transparent ink for 3D ink-jet printing and a preparation method thereof, so as to overcome the problem of yellowing and turbidity of a product produced by the light-curable transparent ink in the prior art.

The present invention provides a light-curable transparent ink for 3D ink-jet printing, comprising the following components: an acrylate monomer, a mercapto compound, a surfactant, a photoinitiator, and an additive. When the ink of the present invention is utilized in a ink-jet printing process, the photoinitiator in the ink is induced by a light source irradiating on the printed product, to produce free radicals, promoting polymerization reaction between the acrylate monomer and the mercapto compound, thereby gradually curing the ink, and eventually producing a solid printed product. The mercapto compound in the ink composition of the present invention has excellent resistance to yellowing, and the above composition does not produce any quinone structure under light irradiation, so yellowing is less likely to occur, and the transparency is significantly improved compared to the transparent printed product in the prior art. Meanwhile, during the printing process, the surfactant can also participate in the polymerization process to improve the transparency of the printed product. The light source used in the present invention is not particularly limited, and may be ultraviolet light, visible light or the like, depending on the photoinitiator selected for the ink. For example, when the photoinitiator used in the ink produces a large amount of free radicals under irradiation of ultraviolet light, the ink containing the photoinitiator should be irradiated with ultraviolet light during the light-curable reaction. If the photoinitiator used in the ink produces a large amount of free radicals under the irradiation of visible light, the ink containing the photoinitiator should be irradiated with visible light during the light-curable reaction.

In addition to the above components, the ink composition of the present invention may also include non-mercapto-modified acrylate oligomer with good resistance to yellowing. When the light source irradiates on a formed printed product, the light source induces the photoinitiator in the ink to produce free radicals, causing polymerization among the acrylate monomer, the mercapto compound and non-mercapto-modified acrylate oligomer, to gradually cure the ink and ultimately produce a solid print product.

Specifically, the light-curable transparent ink of the present invention comprises the following components in parts by weight: 0 to 60 parts of non-mercapto-modified acrylate oligomer, 25 to 50 parts of acrylate monomer, 10 to 50 parts of mercapto compound, 0.01 to 2 parts of surfactant, 0.5 to 5 parts of photoinitiator, and 0.5 to 5 parts of additive.

The light-curable ink of the present invention has improved application performance and printing effect by selecting the components of the composition. For example, 9-15 cps of low viscosity and 19-30 dyn of surface tension can be achieved at an operation temperature of equal to or higher than 40° C. Therefore, the ink of the present invention can not only create a printed product that is not easy to yellow, but also eliminate the need for any printer head with high temperature resistance due to low viscosity, which not only saves energy consumption, but also effectively prolongs the service life of the printer head. Low surface tension contributes to quick setting of the light-curable transparent ink, resulting in a 3D object with good stability.

like, but the mercaptan contains at least 8 carbon atoms. For example, the mercaptan may specifically be dodecyl mercaptan, hexadecyl mercaptan, ethylene glycol bis (3-mercaptopropionate) GDMP, 1,4-butanediol bis (3-mercaptopropionate) BDMP, trimethylolpropane tris (3-mercaptopropionate) TMPMP, pentaerythritol tetrakis (3-mercaptopropionate) PETMP, γ-mercaptopropyl trimethoxy silane KH590, and the like.

Table 1 shows the property parameters of some of the mercapto-modified aliphatic urethane acrylate oligomers and mercaptans in the mercapto compounds of the present invention.

TABLE 1

| Chemical Classification | Commercially Available Product | Functionality/ Molecular Formula | Viscosity (cps/25° C.) |
|---|---|---|---|
| Mercapto-modified aliphatic urethane acrylate oligomer | Greatech GT8010 | 4 | 100 |
| | Genomer 7302 | 3 | 110 |
| | UT85602 | — | 200 |
| Mercaptan | dodecyl mercaptan | $C_{12}H_{26}S$ | — |
| | hexadecyl mercaptan | $C_{16}H_{34}S$ | — |
| | Ethylene glycol bis (3-mercaptopropionate) GDMP | $C_8H_{14}O_4S_2$ | 10 |
| | 1,4-butanediol bis (3-mercaptopropionate) BDMP | $C_{10}H_{18}O_4S_2$ | 15 |
| | Trimethylolpropane tris (3-mercaptopropionate) TMPMP | $C_{15}H_{26}O_6S_3$ | 125 |
| | Pentaerythritol tetrakis (3-mercaptopropionate) PETMP | $C_{17}H_{28}O_8S_4$ | 450 |

Further, the mercapto compound comprises one or more of mercapto-modified acrylate oligomer and mercaptan. The mercapto-modified acrylate oligomer has excellent yellowing resistance, and may specifically comprise one or more of mercapto-modified aliphatic urethane acrylate oligomer and mercapto-modified silicone photosensitive resin oligomer.

The mercapto-modified aliphatic urethane acrylate oligomer is a type of aliphatic urethane acrylate oligomer and mainly refers to an oligomer comprising ammonia ester bond (—NHCOO—) in its molecular structure in addition to mercapto group. The ammonia ester bond can form a variety of hydrogen bonds between polymer chains to enhance the abrasion resistance and flexibility of the printed product, and to give the printed product a high elongation at break, and thereby the printed product has good comprehensive performance. Commercially available mercapto-modified aliphatic urethane acrylate oligomes mainly include Greatech GT8010 from Goodech Company, Genomer 7302 from RAL Company, and UT85602, Unicryl R-9119 and UT87799 from Wraio Chemicals, and the like.

The mercapto-modified silicone photosensitive resin oligomer is a type of silicone photosensitive resin oligomer, and mainly refers to an acrylate oligomer comprising in its molecular structure silicon-oxygen bond (—Si—O—) in addition to mercapto group, the characteristics of low yellowing property, low viscosity and low odor, etc. Currently, there are no commercially available mercapto silicone photosensitive resin oligomer, but self-prepared products such as polyalkyl mercaptopropyl siloxane resin and mercaptan-olefin functionalized polysiloxane systems (referring to "Research Progress on Light-curable Organosilicone Materials", published in, Materials Review, Vol. 20, Issue 4, April 2006) can be used.

The mercaptan of the present invention may include alkyl mercaptan, mercaptoacetate, mercaptopropionate, and the In order to further reduce the possibility of yellowing in the printed product, the acrylate monomer in the light-curable transparent ink of the present invention specifically refers to an acrylate monomer that does not contain a benzene ring structure. Specifically, the acrylate monomer of the present invention may be an aliphatic acrylate monomer. In addition, the number of conjugated bonds contained in the acrylate monomer is not more than 5. For example, there are no more than 5 —C=C—, —N=N—, —N=O— or —C=S— or the like.

The aliphatic acrylate monomer comprises one or more of monofunctional aliphatic acrylate monomer, bifunctional aliphatic acrylate monomer, multifunctional aliphatic acrylate monomer and cycloalkane acrylate monomer.

Specifically, the monofunctional aliphatic acrylate monomer may be isodecyl acrylate, which may be commercially available as EM219, EM2191, EM309, etc., from Taiwan Changxing Company; lauryl acrylate, which may be commercially available as EM215, etc., from Taiwan Changxing Company; or ethoxy ethoxy ethyl acrylate, which may be commercially available as EOEOEA from DSM Company, EM211 from Changxing Company, etc. Specifically, the bifunctional aliphatic acrylate monomer may be bifunctional propylene glycol diacrylate, such as dipropylene glycol diacrylate (DPGDA), tripropylene glycol diacrylate (TPGDA) or other diol diacrylate such as 1,6-hexanediol diacrylate (HDDA), wherein commercially available products of the dipropylene glycol diacrylate (DPGDA) include such as SR508 NS from Sartomer Company, EM222 from Changxing Company, etc.; commercially available products of triethylene glycol diacrylate (TPGDA) includes such as SR306 NS from Sartomer Company, EM223 from Changxing Company, etc.; commercially available products of 1,6-hexanediol diacrylate (HDDA) include such as SR238 NS from Sartomer Company, EM221 from Changxing Company, HDDA from DSM Company, etc. Specifically, the trifunctional aliphatic acrylate monomer may be ethoxylated trimethylolpropane triacrylate (TMPTA), propoxylated glycerol triacrylate, etc., wherein commercially available products of ethoxylated trimethylolpropane triacrylate (TMPTA) include such as EM2382 from Changxing Company, etc.; commercially available products of propoxylated glycerol triacrylate include such as EM2387 from Changxing Company, etc. Specifically, the polyfunctional aliphatic acrylate monomer may be dipentaerythritol pentaacrylate, and commercially available products include such as SR399 LV NS from Sartomer Company, etc., wherein the polyfunctional aliphatic acrylate monomer is preferably an aliphatic acrylate monomer with no more than five functional groups, otherwise the volumetric shrinkage of the printed 3D products could be affected.

Specifically, the cycloalkane acrylate monomer may be 3,3,5-trimethylcyclohexane acrylate, isobornyl acrylate IBOA, tricyclodecane dimethanol diacrylate, etc., wherein commercial products of 3,3,5-trimethylcyclohexane acrylate include such as SR420 from Sartomer Company, EM2104 from Changxing Company, etc.; commercial products of isobornyl acrylate IBOA include such as SR506 NS from Sartomer Company, EM70 from Changxing Company, IBXA from Osaka Organic Chemical Industry Ltd. etc.; commercial products of tricyclodecane dimethanol diacrylate include such as SR833S from Sartomer Company, EM2204 from Changxing Company, etc.

It is noteworthy that, if the acrylate monomer component in the present invention is selected from a plurality of acrylate monomer compounds, that is, a mixture of a plurality of acrylate monomer compounds, the viscosity of the acrylate monomer compound with the highest content should be less than 15 cps at 25° C.

Table 2 shows the property parameters of some of the acrylate monomers in the present invention.

nia ester bond can form a variety of hydrogen bonds between polymer chains to enhance the abrasion resistance and flexibility of the printed product, and to give the printed product a high elongation at break, and thereby the printed product has good comprehensive performance. Specifically, in the present invention, the non-mercapto-modified aliphatic urethane acrylate oligomer may be a type of aliphatic urethane acrylate oligomer that is not modified by any group, or a type of aliphatic urethane acrylate oligomer that is modified by a group other than mercapto group. The specific groups for modifying the aliphatic urethane acrylate oligomer are not limited in the present invention. The current non-mercapto-modified aliphatic urethane acrylate oligomers on the market include such as CN8007 NS, CN8011 NS, CN9006 NS, CN9007, CN9010 NS, CN9178 NS, CN963B80, CN985B88, etc., from Sartomer Company, 6106, 6113, 6115J-80, 6131-1, 6150-100, 6170, 6217, DR-U021, DR-E850, etc., from Taiwan Changxing Company, Unicryl R-7162 from Wraio Chemicals, 4256, G1122, Genomer 4297 from RAL Company, and Greatech GT8440, Greatech GT-8220, Greatech GT-8239, Miramer PU340, Miramer PU2100, Miramer PU5000, from Goodech Company.

The non-mercapto-modified silicone photosensitive resin oligomer is a type of silicone photosensitive resin oligomer and mainly refers to an acrylate oligomer comprising silicon-oxygen bond (—Si—O—) in the molecular structure, having the characteristics of low yellowing property, low viscosity and low odor, etc. . . . . Specifically, in the present invention, the non-mercapto-modified silicone photosensitive resin oligomer may be a type of silicone photosensitive resin oligomer that is not modified by any group, or a type of silicone photosensitive resin oligomer that is modified by a group other than mercapto group. The specific groups for modifying the silicone photosensitive resin oligomer are not limited in the present invention. Currently commercially

TABLE 2

| Chemical Name | Commercially Available Product | Functionality | Molecular Weight | Viscosity (cps/25° C.) |
| --- | --- | --- | --- | --- |
| Lauryl acrylate | EM215 | 1 | 240 | 4-8 |
| Ethoxy ethoxy ethyl acrylate | EM211 | 1 | 388 | 3-8 |
| 1,6-hexanediol diacrylate | SR238 NS | 2 | 226 | 9 |
| Triethylene glycol diacrylate | EM223 | 2 | 300 | 8-16 |
| Ethoxylated trimethylolpropane triacrylate | EM2382 | 3 | 692 | 80-110 |
| Dipentaerythritol pentaacrylate | SR399 LV NS | 5 | 524 | 7000 |
| 3,3,5-trimethylcyclohexane acrylate | EM2104 | 1 | 196 | 2-8 |
| Isobornyl acrylate IBOA | IBXA | 1 | 208 | 5-15 |
| Tricyclodecane dimethanol diacrylate | EM2204 | 2 | 304 | 110-150 |

Further, the non-mercapto-modified acrylate oligomer includes one or more of pure acrylate oligomer, non-mercapto-modified aliphatic urethane acrylate oligomer and non-mercapto-modified silicone photosensitive resin oligomer.

The pure acrylate oligomer has good flexibility and solvent resistance, and adheres well to various substrates. Currently, commercially available products of the pure acrylate oligomer specifically include such as 6530B-40, DR-A815, DR-A830, DR-A845, and DR-A870, from Taiwan Changxing Company.

The non-mercapto-modified aliphatic urethane acrylate oligomer is a type of aliphatic urethane acrylate oligomer, and mainly refers to an oligomer comprising ammonia ester bond (—NHCOO—) in the molecular structure. The ammoavailable non-mercapto-modified silicone photosensitive resin oligomer includes EB350 and EB1360 from Cytec Company, 6225 from Changxing Company, and B-816, B-818 etc., from Bossin Technology.

It is noteworthy in the present invention that if no non-mercapto-modified acrylate oligomer is included as a component of the light-curable transparent ink of the present invention, then the mercapto compound in the composition must comprise at least one of mercapto-modified aliphatic urethane acrylate oligomer or mercapto-modified silicone photosensitive resin oligomer.

Table 3 shows the property parameters of some of the non-mercapto-modified acrylate oligomers of the present invention.

TABLE 3

| Chemical Classification | Commercially Available Product | Functionality | Viscosity (cps/25° C.) |
|---|---|---|---|
| Pure acrylate oligomer | 6530B-40 | — | 13000-16500 |
| | DR-A830 | — | 15-35 |
| | DR-A870 | — | 600-1200 |
| Non-mercapto-modified aliphatic urethane acrylate oligomer | CN985B88 | 2 | 205 |
| | CN9010 NS | 6 | 2200 |
| | 6115J-80 | 2 | 2600-4200 |
| | Greatech GT8440 | 3 | 1000 |
| Non-mercapto-modified silicone UV resin oligomer | EB350 | 2 | 350 |
| | 6225 | — | 200-900 |
| | B-818 | 3.5 | 3000-4500 |

Further, the surfactant includes one or more of radiation-crosslinkable silicone acrylate and modified polysiloxane polymer. The radiation-crosslinkable silicone acrylate may be TEGO RAD 2010, 2011, 2100, 2200N, 2250, etc., from Evonik Company. The radiation-crosslinkable silicone acrylate can participate in the light-curable reaction by way of cross-linking reaction so as to inhibit turbidity of the printed product. The modified polysiloxane polymer can be BYK-333, BYK-371 and BYK-377 from BYK Company, Tego wet 270 and Tego Glide 450, from Evonik Company, and the like.

Further, the photoinitiator used in the present invention is free radical photoinitiator. Specifically, the free radical photoinitiator may be acylphosphine oxide, such as products under the trade name of TEPO (2,4,6-trimethylbenzoyl-ethoxy-phenylphosphine oxide), TPO (2,4,6-trimethylbenzoyl-diphenylphosphine oxide), 819 (bis (2,4,6-trimethylbenzoyl) phenylphosphine oxide) and the like; or may be α-hydroxy ketones, such as products under the trade name of 1173 (2-hydroxy-2-methyl-1-phenyl acetone), 184 (1-hydroxy-cyclohexyl benzophenone), 2959 (2-hydroxy-2-methyl-1-p-hydroxyethylether phenyl acetone) and the like; or may be oxime esters, such as Irgacure OXE 01 and Irgacure OXE 02 from BASF Corporation, whose structural formulas are, respectively:

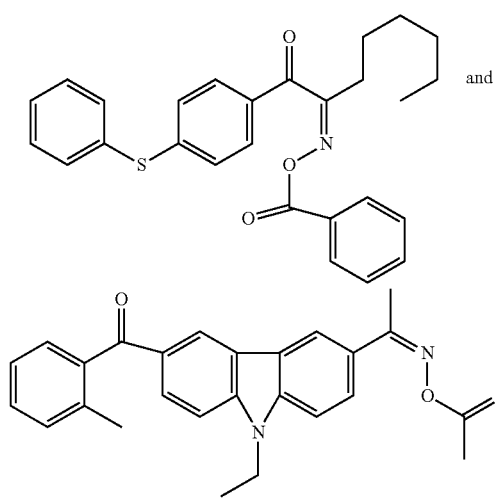

and

The above-described free radical photoinitiator does not cause yellowing of the reaction system.

Further, the additive is selected from one or more of toughener, defoamer and stabilizer.

The toughener may be polycaprolactone triol and polyol products, such as 305T and 205N from Essen Company, Greatech GT8003 from Goodech Company, etc. The defoamer is selected from polymers not containing silicone, and the main function of the defoamer is to eliminate bubbles produced during filtration and printing, thereby avoiding influence of the bubbles on printing fluency. The defoamer includes such as silicone-free defoamer TEGO Airex 920, TEGO Airex 921, etc. from Evonik Company. The stabilizer may also be referred to as polymerization inhibitor, which can prevent deposition in the ink and ensure the stability during ink storage. The stabilizer used in the present invention can be GENORAD 16, GENORAD 18, GENORAD 20, and GENORAD 22, from RAL Company, and alkyl acrylate phosphate PM2010 from Kinde Chemical, and polymerization inhibitor ZJ-701 from TCI Company, and so on.

The present invention also provides a method for preparing any one of the above light-curable transparent inks, comprising the following steps:

1) mixing evenly all components except the photoinitiator to obtain a first mixture; then adding the photoinitiator to the first mixture and dissolving the photoinitiator completely, to obtain a second mixture;

2) filtering the second mixture and collecting the resulting filtrate to obtain the light-curable transparent ink.

When the ink of the present invention comprises a non-mercapto-modified acrylate oligomer as a component, the non-mercapto-modified acrylate oligomer, an acrylate monomer, a mercapto compound, a surfactant, and an additive are mixed in step 1) to obtain the first mixture. Otherwise, the acrylate monomer, the mercapto compound, the surfactant, and the additive are mixed to obtain the first mixture. In the present invention, the order of adding the components in the process of obtaining the first mixture is not limited.

The preparation method of the present invention can be simply completed by the mixing and filtering, which is easy to operate. The method not only helps to form a stable ink, but also facilitates liquefaction and ejection of the ink, so that it is more convenient to use, especially suitable for printing of 3D objects.

It will be appreciated that the preparation of the light-curable transparent ink of the present invention needs to be performed in an environment outside the range of the initiation wavelength of the selected photoinitiator, so as to prevent the components in the ink from polymerization induced by light in the environment.

Further, the filtration employs a microporous membrane to perform a two phase filtering on the second mixture, wherein the first phase filtering employs a glass fiber membrane with a pore diameter of 0.45 μm, and the second phase filtering employs a polypropylene membrane (PP membrane for short) with a pore diameter of 0.22 μm. Using the phase-by-phase filtering, the present invention filters the second mixture for at least twice, wherein the pore diameter of the microporous membrane for a previous phase is larger than that of the next phase, and the pore diameter for the final phase is smaller than the orifice diameter of the print nozzle in the ink-jet printing.

Further, the method comprises degassing treatment on the collected filtrate. Time of the degassing treatment is controlled no longer than 5 hours. The degassing treatment may be realized using a method selected from one of decompression degassing, atmospheric degassing, and heated degassing. Preferably, the time of the degassing treatment is controlled within 1 to 3 hours. By degassing the ink, the ink has good fluency during use, and the printed lines will not broke due to interference of air bubbles in the ink, which will ultimately contribute to forming accuracy of 3D objects.

The present invention has at least the following advantages:

1. The non-mercapto-modified acrylate oligomer and mercapto-modified acrylate oligomer used in the ink make the printed product have a small shrinkage, typically less than 5% volume shrinkage, when the ink undergoes the light-curable reaction;

2. The mercapto group of the mercapto compound used in the ink has high reactivity, which makes the light-curable reaction complete when the ink undergoes the light-curable reaction, so that the printed product will not discolor for a long period of time, and the high reactivity can effectively reduce the amount of photoinitiator to avoid yellowing of the printed product caused by too much photoinitiator. Meanwhile, the mercapto group has a certain degree of reduction, which has a certain inhibitory effect on the yellowing of the printing product caused by aging and oxidation of the resin in the ink, thereby providing the printed product with a colorless and transparent appearance;

3. The surfactant used in the ink can not only effectively reduce surface tension of the ink, improving leveling of the ink, but also participate in the entire light-curable reaction, so that the printed product shows a transparent appearance;

4. The ink of the present invention has wide application conditions, can perform ink-jet printing at a low temperature, has good printing fluency, and prolongs service life of the print head;

5. The ink does not contain a volatile solvent, and all components participate in the light-curable reaction, giving no VOC emission, and will not cause environmental pollution.

DESCRIPTION OF EMBODIMENTS

To make the objectives, technical solutions and advantages of the embodiments of the present invention clearer, the following will clearly and completely describe the technical solutions in the embodiments of the present invention with reference to the drawings of the present invention. Obviously, the described embodiments are a part of the embodiments of the present invention, not all of them. All other embodiments obtained by a person of ordinary skill in the art based on the embodiments of the present invention without creative efforts shall fall within the protection scope of the present invention.

Embodiment 1

| | |
|---|---|
| Isobornyl acrylate IBOA EM70 | 30 g |
| Tricyclodecane dimethanol diacrylate EM2204 | 18.68 g |
| Mercapto-modified aliphatic urethane acrylate oligomer Genomer 7302 | 48 g |
| TPO (acylphosphine oxide free radical photoinitiator) | 0.8 g |
| 184 (α-hydroxy ketone free radical photoinitiator) | 2 g |
| GENORAD16 (stabilizer) | 0.5 g |
| BYK-377 (surfactant) | 0.02 g |

Preparation Method:

(1) Place 30 g of isobornyl acrylate IBOA, 18.68 g of tricyclodecane dimethanol diacrylate EM2204, 48 g of mercapto-modified aliphatic urethane acrylate oligomer Genomer 7302, 0.02 g of BYK-377, and 0.5 g of GENORAD16 in a glass container, and stir with a stirrer to obtain a uniformly mixed first mixture; subsequently, add 0.8 g of TPO free radical photoinitiator and 2 g of 184 free radical photoinitiator to the first mixture, and stir continuously until the free radical photoinitiator is completely dissolved to obtain a second mixture;

(2) Use a glass fiber membrane with a pore diameter of 0.45 μm to perform a primary filtration, and a PP membrane with a pore diameter of 0.22 μm to perform a secondary filtration to obtain the filtrate;

(3) In a vacuum of 0.1 MPa, carry out decompression filtration for 1 hour to eliminate air bubbles from the filtrate, obtaining a light-curable transparent ink for 3D ink-jet printing in the end.

Conduct Property Test on the Light-Curable Transparent Ink for 3D Ink-Jet Printing in Embodiment 1:

1. Test the viscosity and surface tension of the light-curable transparent ink for 3D ink-jet printing in this embodiment at room temperature and operating temperature using a DV-I digital display viscometer and a BZY-1 fully automatic surface tension meter.

2. Apply the light-curable transparent ink for 3D ink-jet printing of this embodiment to a 3D light-curable ink-jet printer with an industrial print head, set the wavelength of the ultraviolet light source to 395 nm, and test the fluency of the ink and the accuracy of the formed product, respectively, at an appropriate ejection temperature. The accuracy test is mainly reflected by the volume shrinkage ratio, using a test method including: using a pycnometer approach with water as a reference, determining density $\rho_1$ of the photosensitive resin before curing and density $\rho_2$ after complete curing, at 25° C., and calculating volume shrinkage ratio using the following equation:

$$\text{Volume shrinking rate } \% = \frac{\rho_2 - \rho_1}{\rho_1} \times 100\%$$

3. Light Transmittance Test

Apply the light-curable transparent ink for 3D ink-jet printing of this embodiment to a 3D light-curable ink-jet printer having an industrial print head, set the wavelength of the ultraviolet light source to 395 nm, and print a 50 mm*50 mm square with a thickness of 2 mm at ejecting temperature. Use a UV visible spectrophotometer to measure the light transmittance, that is, a ratio of light quantity passing through a sample to light quantity irradiated on the sample, represented as a percentage. More details of the measurement method may be found in GB/T 2410-2008 *Determination of the Luminous Transmittance and Haze of Transparent Plastics*. A high light transmittance indicates a low yellowing degree of the printed product.

Above test results are shown in Table 4.

Embodiment 2

| | |
|---|---|
| Non-mercapto-modified silicone UV resin oligomer EB350 | 28 g |
| Isodecyl acrylate EM2191 | 30 g |
| Ethoxylated trimethylolpropane triacrylate EM2382 | 6 g |
| Mercapto-modified aliphatic urethane acrylate oligomer Greatech GT8010 | 24 g |
| Dodecyl mercaptan | 5 g |
| 819 (acylphosphine oxide free radical photoinitiator) | 2.2 g |
| Oxime ester Irgacure OXE 01 | 2.6 g |
| GENORAD16 (stabilizer) | 0.8 g |
| Silicone-free defoamer TEGO Airex 920 | 0.4 g |
| Silicone acrylate TEGO RAD 2010 | 1.0 g |

Preparation Method:

The preparation method of the light-curable transparent ink for 3D ink-jet printing in this embodiment is basically the same as that in Embodiment 1, except that the time for decompression filtration for degassing is adjusted to 2 hours. Conduct property test on the light-curable transparent ink for 3D ink-jet printing according to the same test method as in Embodiment 1, and the test results are shown in Table 4.

Embodiment 3

| | |
|---|---|
| Non-mercapto modified aliphatic urethane acrylate oligomer CN985B88 | 51 g |
| Pure acrylate oligomer DR-A870 | 8.7 g |
| 3,3,5-trimethylcyclohexane acrylate EM2104 | 25 g |
| Ethylene glycol bis (3-mercaptopropionate) GDMP | 10 g |
| 184 (α-hydroxy ketone free radical photoinitiator) | 2.8 g |
| Modified polysiloxane polymer BYK-333 | 0.5 g |
| Silicone acrylate TEGO RAD 2011 | 1.4 g |
| GENORAD 20 (stabilizer) | 0.6 g |

Preparation Method:

The preparation method of the light-curable transparent ink for 3D ink-jet printing in this embodiment is basically the same as that in Embodiment 1, except that degassing treatment is performed by means of heating, heating the light-curable transparent ink for 3D ink-jet printing to 40-60° C. for 1 hour.

Conduct property test on the light-curable transparent ink for 3D ink-jet printing according to the same test method as in Embodiment 1, and the test results are shown in Table 4.

Embodiment 4

| | |
|---|---|
| Non-mercapto-modified aliphatic urethane acrylate oligomer CN9010 NS | 32 g |

Preparation Method:

The preparation method of the light-curable transparent ink for 3D ink-jet printing in this embodiment is basically the same as in Embodiment 1, except that the time for decompression degassing is adjusted to 3 hours.

Conduct property test on the light-curable transparent ink for 3D ink-jet printing in this embodiment according to the same test method as in Embodiment 1, and the test results are shown in Table 4.

Embodiment 5

| | |
|---|---|
| Isobornyl acrylate IBOA IBXA | 40 g |
| Propoxylated glycerol triacrylate EM2387 | 8 g |
| Polyalkyl mercapto propyl siloxane resin | 36 g |
| Trimethylolpropane tris (3-mercaptopropionate) TMPMP | 10 g |
| TPO (acylphosphine oxide free radical photoinitiator) | 0.6 g |
| 184 (α-Hydroxy ketone free radical photoinitiator) | 1.6 g |
| 305T (toughener) | 2.6 g |
| PM2010 (stabilizer) | 0.2 g |
| BYK-333 (surfactant) | 1 g |

Preparation Method:

The preparation method of the light-curable transparent ink for 3D ink-jet printing in this embodiment is basically the same as in Embodiment 1, except that the degassing treatment is performed by standing at atmospheric pressure for 3 hours.

Conduct property test on the light-curable transparent ink for 3D ink-jet printing in this embodiment according to the same test method as in Embodiment 1, and the test results are shown in Table 1.

TABLE 4

Property parameters of the light-curable transparent ink for 3D ink-jet printing in each embodiment

| Property | Embodiment # | | | | |
|---|---|---|---|---|---|
| | 1 | 2 | 3 | 4 | 5 |
| Viscosity at Room Temperature (cps) | 28.3 | 38.4 | 79.6 | 86.8 | 54.2 |
| Surface Tension at Room Temperature (dyn) | 22.5 | 24.2 | 22.5 | 24.8 | 21.9 |
| Ejection Temperature (° C.) | 40 | 50 | 70 | 75 | 60 |
| Viscosity at Ejection Temperature (cps) | 12.4 | 12.8 | 12.8 | 12.5 | 12.2 |
| Surface tension at Ejection Temperature (dyn) | 21.7 | 22.8 | 21.7 | 22.6 | 20.4 |
| Shrinkage ratio | 3.64% | 3.89% | 3.28% | 3.52% | 3.95% |
| Fluency | OK | OK | OK | OK | OK |
| Light transmittance | 93.5% | 92.8% | 92.4% | 91.8% | 93.1% |

-continued

| | |
|---|---|
| Non-mercapto-modified silicone UV resin oligomer 6225 | 8.1 g |
| Ethoxy ethoxy ethyl acrylate EOEOEA | 38.7 g |
| Hexadecyl mercaptan | 15 g |
| TPO (acylphosphine oxide free radical photoinitiator) | 0.6 g |
| Silicone acrylate TEGO RAD 2250 | 0.8 g |
| Greatech GT8003 (toughener) | 4.2 g |
| TEGO Airex 920 (defoamer) | 0.5 g |
| ZJ-701 (stabilizer) | 0.1 g |

It can be seen from the results of Table 4 that:

1. The light transmittance of the printed product obtained by the light-curable transparent ink for 3D ink-jet printing of the present invention is higher than 90%, so the light-curable transparent ink for 3D ink-jet printing of the present invention can well inhibit yellowing of the printed product, and has good transparency.

2. The light-curable transparent ink for 3D ink-jet printing of the present invention has a suitable viscosity at a low operating temperature (not lower than 40° C.), and thus it is not necessary to use a high-temperature-resistant print head, thereby effectively prolonging the service life of the print head.

3. The light-curable transparent ink for 3D ink-jet printing of the present invention has a suitable surface tension, so that the 3D object formed during the printing process has low deformation possibility.

4. The light-curable transparent ink for 3D ink-jet printing of the present invention has a low shrinkage ratio, and thus the formed 3D object as a whole has a low shrinkage ratio, and is unlikely to experience warpage.

5. The light-curable transparent ink for 3D ink-jet printing of the present invention has good fluency, and basically contains no particles, so that the stability of the light-curable transparent ink for 3D ink-jet printing can be ensured, and the problem of nozzle clogging of the print head during the printing process is avoided.

Finally, it should be noted that the above embodiments are only used to illustrate the technical solutions of the present invention, rather than limiting the same. Although the present invention has been described in detail with reference to the foregoing embodiments, those skilled in the art should understand that it is still possible to modify the technical solutions described in the foregoing embodiments or equivalently replace some or all of the technical features, and these modifications or replacements will not make essence of corresponding technical solutions deviate from the scope of the technical solutions of the embodiments of the present invention.

What is claimed is:

1. A light-curable transparent ink for 3D ink-jet printing, comprising the following components in parts by weight: 0 to 60 parts of a non-mercapto-modified acrylate oligomer, 25 to 50 parts of the acrylate monomer, 10 to 50 parts of the mercapto compound, 0.01 to 2 parts of the surfactant, 0.5 to 5 parts of the photoinitiator, and 0.5 to 5 parts of the additive,
   wherein the mercapto compound comprises a mercapto-modified acrylate oligomer,
   wherein the mercapto-modified acrylate oligomer comprises one or more of a mercapto-modified aliphatic urethane acrylate oligomer and a mercapto-modified silicone photosensitive resin oligomer.

2. The light-curable transparent ink according to claim 1, wherein the light-curable transparent ink has a viscosity of 9~15 cps at an operating temperature and surface tension of 19~30 dyn;
   wherein the operating temperature is equal to or higher than 40° C.

3. The light-curable transparent ink according to claim 2, wherein the mercapto compound further comprises a mercaptan.

4. The light-curable transparent ink according to claim 3, wherein the number of carbon atoms of the mercaptan is not less than 8.

5. The light-curable transparent ink according to claim 1, wherein the acrylate monomer is an acrylate monomer that does not contain a benzene ring structure.

6. The light-curable transparent ink according to claim 5, wherein the number of conjugated bonds contained in the acrylate monomer is not more than 5.

7. The light-curable transparent ink according to claim 6, wherein the acrylate monomer comprises an aliphatic acrylate monomer.

8. The light-curable transparent ink according to claim 7, wherein the aliphatic acrylate monomer comprises one or more of a monofunctional aliphatic acrylate monomer, a bifunctional aliphatic acrylate monomer, a multifunctional aliphatic acrylate monomer and a cycloalkane acrylate monomer.

9. The light-curable transparent ink according to claim 8, wherein the multifunctional aliphatic acrylate monomer has a functionality of not more than 5.

10. The light-curable transparent ink according to claim 9, wherein, when the acrylate monomer is a mixture of a plurality of compounds, the compound occupying the highest proportion in the mixture has a viscosity of less than 15 cps at 25° C.

11. The light-curable transparent ink according to claim 10, wherein the non-mercapto-modified acrylate oligomer comprises one or more of a pure acrylate oligomer, a non-mercapto-modified aliphatic urethane acrylate oligomer and a non-mercapto-modified silicone photosensitive resin oligomer.

12. The light-curable transparent ink according to claim 1, wherein the surfactant comprises one or more of a radiation-crosslinkable silicone acrylate and a modified polysiloxane polymer.

13. The light-curable transparent ink according to claim 12, wherein the photoinitiator is free radical photoinitiator.

14. The light-curable transparent ink according to claim 13, wherein the additive is selected from one or more of a toughener, a defoamer and a stabilizer.

15. A preparation method for light-curable transparent ink according to claim 1, comprising the following steps:
   1) mixing evenly all components except the photoinitiator to obtain a first mixture; then adding the photoinitiator to the first mixture and dissolving the photoinitiator completely to obtain a second mixture;
   2) performing filtration of the second mixture and collecting the resulting filtrate to obtain the light-curable transparent ink.

16. The preparation method according to claim 15, wherein the filtration employs a microporous membrane to perform a two phase filtering on the second mixture, wherein the first phase filtering employs a glass fiber membrane with a pore diameter of 0.45 μm, and the second phase filtering employs a polypropylene membrane with a pore diameter of 0.22 μm.

17. The preparation method according to claim 15, further comprising degassing the collected filtrate.

* * * * *